US007644883B2

(12) United States Patent
Mauch et al.

(10) Patent No.: US 7,644,883 B2
(45) Date of Patent: *Jan. 12, 2010

(54) FOOD PROCESSOR LID

(75) Inventors: Jeffrey T. Mauch, Mechanicsville, VA (US); Jennifer D. O'Flynn, Richmond, VA (US); William D. Starr, Richmond, VA (US); Francesco Leopoldo Carnevale, Glen Allen, VA (US); James H. Hallar, Richmond, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 162 days.

This patent is subject to a terminal disclaimer.

(21) Appl. No.: 11/734,091

(22) Filed: Apr. 11, 2007

(65) Prior Publication Data
US 2007/0181720 A1  Aug. 9, 2007

Related U.S. Application Data

(63) Continuation of application No. 10/781,239, filed on Feb. 18, 2004, now Pat. No. 7,252,252.

(51) Int. Cl.
*B02C 17/02* (2006.01)
*B07B 13/00* (2006.01)
(52) U.S. Cl. .................... 241/92; 241/282.1; 241/282.2
(58) Field of Classification Search ............. 241/282.1, 241/282.2, 92; 99/337, 510, 509
See application file for complete search history.

(56) References Cited

U.S. PATENT DOCUMENTS

| 751,159 | A | 2/1904 | Gage |
| 755,431 | A | 3/1904 | Austin |
| 774,217 | A | 11/1904 | Welke |
| 2,001,075 | A | 5/1935 | Sundstrand |
| 2,128,792 | A | 8/1938 | Berarducci |
| 2,678,073 | A | 5/1954 | DeNardis |
| 3,493,022 | A | 2/1970 | Mantelet |
| 3,970,258 | A | 7/1976 | Mantelet |
| 4,111,372 | A | 9/1978 | Hicks et al. |
| 4,127,342 | A | 11/1978 | Coggiola |

(Continued)

OTHER PUBLICATIONS

U.S. Appl. No. 11/779,924, filed Jul. 19, 2007 to Mauch et al.

*Primary Examiner*—Bena Miller
(74) *Attorney, Agent, or Firm*—Panitch Schwarze Belisario & Nadel LLP

(57) ABSTRACT

A lid for a bowl of a food processor for processing a relatively large size or large volume of foodstuff including a top lid wall and a feed tube extending from the top lid wall along a feed axis. The feed tube including an inner feed surface defining a feed cavity and a mouth for accessing the feed cavity. A feed tube lid is movably secured to the mouth of the feed tube. A food pusher is movably mounted to the feed tube lid. The food pusher and feed tube lid cover the mouth of the feed tube when the feed tube lid and food pusher are in a working position. The food pusher is movable relative to the feed tube in first and second directions in the working position. The first direction is generally parallel to the feed axis and the second direction is generally perpendicular to the feed axis.

6 Claims, 8 Drawing Sheets

U.S. PATENT DOCUMENTS

| | | | |
|---|---|---|---|
| 4,216,917 A | 8/1980 | Clare et al. | |
| 4,226,374 A | 10/1980 | Kafka | |
| 4,307,847 A | 12/1981 | Sontheimer et al. | |
| 4,316,584 A | 2/1982 | Valbona | |
| 4,371,118 A | 2/1983 | Sontheimer et al. | |
| 4,387,860 A | 6/1983 | Necas et al. | |
| 4,396,159 A | 8/1983 | Podell | |
| 4,397,427 A * | 8/1983 | Howard | 241/30 |
| 4,471,915 A * | 9/1984 | Levin et al. | 241/37.5 |
| 4,506,836 A | 3/1985 | Williams | |
| 4,512,522 A | 4/1985 | Williams | |
| 4,523,720 A | 6/1985 | Behringer et al. | |
| 4,540,128 A | 9/1985 | Breeden | |
| 4,542,857 A | 9/1985 | Akasaka | |
| 4,544,103 A | 10/1985 | Breeden | |
| 4,614,306 A | 9/1986 | Doggett | |
| 4,623,097 A | 11/1986 | Sontheimer | |
| 4,674,690 A | 6/1987 | Ponikwia et al. | |
| 4,700,901 A | 10/1987 | McClean | |
| 4,714,203 A | 12/1987 | Williams | |
| 4,799,626 A * | 1/1989 | Hickel et al. | 241/37.5 |
| 4,817,878 A | 4/1989 | Shibata | |
| 4,819,882 A | 4/1989 | Stottmann et al. | |
| 4,824,029 A | 4/1989 | Stottmann et al. | |
| 5,037,033 A | 8/1991 | Stottmann et al. | |
| 5,257,575 A | 11/1993 | Harrison et al. | |
| 5,355,784 A | 10/1994 | Franklin et al. | |
| 5,417,152 A | 5/1995 | Harrison | |
| 5,421,248 A * | 6/1995 | Hsu | 99/512 |
| 5,749,285 A | 5/1998 | Dorner et al. | |
| 5,768,978 A | 6/1998 | Dorner et al. | |
| 5,794,524 A | 8/1998 | Kemker et al. | |
| 5,921,485 A | 7/1999 | Plavcan et al. | |
| 6,397,735 B1 | 6/2002 | Wong | |
| 6,401,657 B1 | 6/2002 | Krishnamurthy | |
| 6,510,784 B1 | 1/2003 | Fevre et al. | |
| 6,568,843 B1 | 5/2003 | Lai | |
| 6,629,492 B1 | 10/2003 | Li | |
| 6,640,692 B1 | 11/2003 | Hilgers et al. | |
| 6,669,124 B2 | 12/2003 | Lazzer | |
| 6,827,305 B2 | 12/2004 | Brezovnik et al. | |
| 6,910,800 B2 | 6/2005 | Wu | |
| 7,028,930 B2 | 4/2006 | Carnevale | |
| 7,069,839 B2 | 7/2006 | Kernan | |
| 7,252,252 B2 | 8/2007 | Mauch et al. | |
| 2004/0042337 A1 | 3/2004 | Yiu | |
| 2005/0178866 A1 | 8/2005 | Mauch et al. | |
| 2006/0087916 A1 | 4/2006 | Yang | |
| 2006/0201341 A1 | 9/2006 | Kernan | |

* cited by examiner

FOOD PROCESSOR LID

CROSS-REFERENCE TO RELATED APPLICATIONS

This application is a continuation of U.S. patent application Ser. No. 10/781,239 filed Feb. 18, 2004 entitled "Food Processor Lid" which is incorporated by reference herein in its entirety.

BACKGROUND OF THE INVENTION

The present application is directed to processing foodstuff and, more particularly, to a food processor lid that that is configured for the processing of a relatively large size or a large volume of foodstuff.

Food processors commonly include a lid with a feed tube extending generally perpendicularly from a lid top surface, a food pusher that is slideably positionable within the feed tube and a bowl with a mouth that removably receives the lid. The feed tube is used to insert food into the bowl during processing and is sized to prevent a user's hand from entering the bowl while the processing tool is in operation. Food may be inserted into the bowl through the feed tube during processing or a foodstuff that is sliced or grated by a rotating disk that is positioned near a rim of the bowl may be inserted through the feed tube. Specifically, Underwriters Laboratories food processor safety requirements demand a feed tube with an average inside diameter that is less than two and one-half inches (2.5") with no dimension greater than three inches (3") and that the processing tool must be recessed at least four inches (4") below the mouth of the feed tube. Underwriters Laboratories requirements also demand that if the average inside diameter of the feed tube is two inches (2") or less, the distance that the tool must be below the plane of the feed tube may be reduced to three and one-half inches (3.5"). The above-listed dimensions for a feed tube are directed to preventing a relatively small hand from being inserted through the feed tube and into the bowl during operation.

Based upon the above-described safety limitations for the feed tube, only relatively small, long and narrow foodstuff may be inserted into the bowl during processing. For example, many potatoes have a minor diameter or width of at least one and one-half inches (1.5") and, therefore, only a single potato may be inserted into the feed tube for processing at one time. In addition, when grating or slicing a large volume of foodstuff, an initial volume of foodstuff is positioned in the relatively small feed tube, a food pusher pushes the foodstuff onto the rotating disk and into the bowl, the food pusher is removed from the feed tube and the process is repeated multiple times until the large volume of grated or sliced foodstuff is produced. Therefore, the size of foodstuff that may be processed and the time that it takes to process a relatively large volume of foodstuff is often prohibitive for food processors with feed tubes that fall within the above-described dimensional safety requirements.

Enlarged feed tubes or feed tubes that have feed dimensions that are greater than the above-described safety dimensions often include covers over their mouths that limit access to the feed cavity and bowl during processing. Such enlarged feed tubes may include a pivoting door comprising a side of the enlarged feed tube that actuates a safety switch when the door completely closes the feed tube, thereby denying access to the feed cavity when the door is open. In addition, enlarged feed tubes having enlarged food pushers that actuate safety switches only when the enlarged food pusher is positioned within or over the enlarged feed tube are used to process relatively large size or a large volume of foodstuff. However, these prior art food processors often do not permit continuous feeding of foodstuff into the enlarged feed tube during processing. A safety switch often cuts power to a motor when the feed cavity is exposed and processing is terminated until the feed cavity is closed or the enlarged food pusher is inserted into the enlarged feed tube thereby expanding processing time.

The preferred embodiment of the lid for a food processor in accordance with the present application has an enlarged feed tube and permits processing of relatively large size or a large volume of foodstuff. The lid of the preferred embodiment also permits limited access to the enlarged feed tube during processing without disabling the cutting tool. The lid is generally simple to use and relatively easy to clean. Permitting access to the relatively large feed tube during operation permits insertion of ingredients into the feed tube without disabling the food processor. In addition, when the enlarged feed tube is exposed and a user's hand is insertable into the mouth of the enlarged feed tube, the lid of the of the preferred embodiment renders the tool and food processor inoperative so a user's hand does not come into contact with a rotating cutting tool. Accordingly, the food processor lid of the preferred embodiment allows processing of relatively large size or a relatively large volume of foodstuff while maintaining safety.

BRIEF SUMMARY OF THE INVENTION

A preferred embodiment of the present application comprises a lid for a bowl of a food processor for processing a relatively large size or a large volume of foodstuff. The lid includes a top lid wall and a feed tube extending from the top lid wall along a feed axis. The feed tube includes an inner feed surface that defines a feed cavity and a mouth for accessing the feed cavity. A feed tube lid is movably mounted to the mouth of the feed tube. A food pusher is movably mounted on the feed tube lid. The food pusher and feed tube lid cover the mouth of the feed tube when the feed tube lid and food pusher are in a working position. The food pusher is movable relative to the feed tube in first and second directions in the working position. The first direction is generally parallel to the feed axis and the second direction is generally perpendicular to the feed axis.

In another aspect, a preferred embodiment is directed to a lid for a bowl of a food processor for processing a relatively large size or a large volume of foodstuff. The lid includes a top lid wall and a feed tube extending from the top lid wall. The feed tube includes a continuous inner feed surface that defines a feed cavity. A movable gate is positioned within the feed cavity. The movable gate is movable within the feed cavity between an open position and a compacting position.

In yet another aspect, a preferred embodiment is directed to a lid for the bowl of a food processor for processing a relatively large size or a large volume of foodstuff. The lid includes a top lid wall and a feed tube extending from the top lid wall along a feed axis. The feed tube includes an inner feed surface that defines a feed cavity. A food pusher is removably positionable within the feed cavity. A feed tube lid is pivotally and removably mounted to the feed tube. The feed tube lid and food pusher cover a mouth of the feed tube in a working position.

BRIEF DESCRIPTION OF THE SEVERAL VIEWS OF THE DRAWINGS

The foregoing summary, as well as the following detailed description of a preferred embodiment of the application, will be better understood when read in conjunction with the appended drawings. For the purposes of illustrating the lid of the present application, there is shown in the drawings a preferred embodiment. It should be understood, however, that the application is not limited to the precise arrangements and instrumentalities shown. In the drawings.

DETAILED DESCRIPTION OF THE INVENTION

Figure 1:
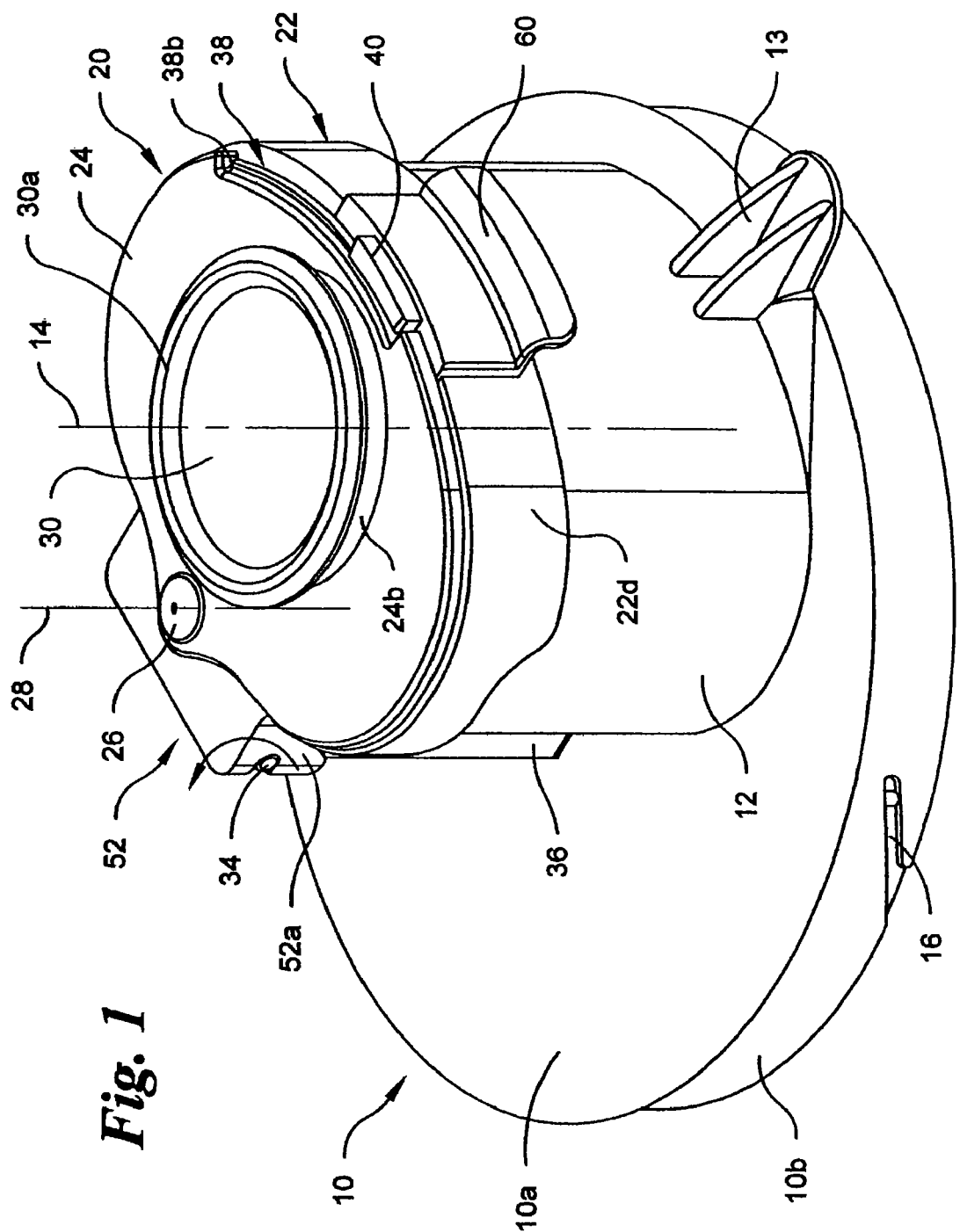
FIG. 1 is a top perspective view of a lid for a food processor in accordance with a preferred embodiment of the present application.

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of the food processor lid, the feed tube lid and designated parts thereof. The terminology includes the above-listed words, derivatives thereof and words of similar import.

Referring to the drawings in detail, wherein like numerals indicate like elements throughout, there is shown in FIGS. 1-8, a preferred embodiment of a lid 10 for a bowl of a food processor (not shown) for processing a relatively large size or a large volume of foodstuff, in accordance with the present invention.

Referring to FIGS. 1, 2, 4, 6 and 7, in the preferred embodiment, the lid 10 is removably mountable to a bowl (not shown) of a food processor. The lid 10 includes a top lid wall 10a and a feed tube 12 extending from the top lid wall 10a. The feed tube 12 extends from the top wall 12a along a feed axis 14. In the preferred embodiment, a skirt or peripheral rim 10b extends downwardly from the top lid wall 10a. The peripheral rim 10b is releasably engageable with the bowl of the food processor. In the preferred embodiment, the peripheral rim 10b includes at least one securing groove 16 on an external side surface that engages a securing lug (not shown) adjacent the mouth of the food processor bowl. The preferred groove 16 projects at an angle Δ measured from horizontal or a bottom plane of the peripheral rim 10b. The preferred angle Δ is approximately twenty-two degrees (22°) and the groove 16 has a length of approximately three centimeters (3 cm). The lid 10 is not limited the above-described angle Δ or length and may have nearly any angle or length that enables the lid 10 to be removably secured to the bowl. In addition, the lid 10 is not limited to at least one securing groove 16 that secures the lid 10 to the bowl of the food processor and may be secured to the bowl in any number of ways that would be obvious to one having ordinary skill in the food processor art. For example, the lid 10 may be secured to the food processor bowl through snap-fit, lugs on the lid 10 that engage grooves on the bowl or fasteners that secure the lid 10 to the bowl.

The lid 10 has a generally circular-shape when viewed from the top or bottom and is preferably constructed of a transparent, molded Styrene Acrylonitrile (SAN) material. The lid 10 is not limited to being transparent, molded Styrene Acrylonitrile (SAN) materials and may be constructed of nearly any rigid, structural material that is able to take on the general shape of the lid 10 and withstand the normal operating conditions of the lid 10. For example, the lid 10 may be constructed of any polymeric, metal, glass or related material that is able to take on the general shape of the lid 10 and withstand the normal operating conditions of the lid 10. The circular shape of the lid 10 is preferred for securing the lid 10 to the circular mouth of the bowl as is obvious to one having ordinary skill in the art. The lid 10 is not limited to circular configurations and may take on nearly any shape that covers the mouth of the bowl and is removably mountable to the bowl.

In the preferred embodiment, the top lid wall 10a is generally planar and covers at least a portion of the mouth of the bowl when the lid 10 is secured to thereto. The feed tube axis 14 is generally perpendicular to the top lid wall 10a in the preferred embodiment and, therefore, the feed tube 12 extends generally perpendicularly from the top lid wall 10a. The feed tube 12 and feed tube axis 14 are not limited to orientations that are perpendicular to the top lid wall 10a. The feed tube 12 and the feed tube axis 14 may extend from the top lid wall 10a at nearly any angle, as long as foodstuff positioned within the feed tube 12 can be fed along the feed axis 14 and into the bowl for processing.

In the preferred embodiment, a shoulder 13 is integrally molded with and extends between a side wall of the feed tube 12 and the top lid wall 10a adjacent a periphery of the lid 10. The shoulder 13 preferably extends beyond a periphery of the top lid wall 10a. The shoulder 13 is preferably integrally molded with the lid 10 and feed tube 12 and is comprised of a pair of side-by-side ramp-shaped legs with arcing upper surfaces. The shoulder 13 is preferably constructed of the same SAN material as the lid 10 and feed tube 12 but is not limited to the SAN material or to being integrally molded with the feed tube 12 and lid 10. The shoulder 13 is preferably used to provide leverage for pivoting the lid 10 relative to a bowl to releasably mount the lid 10 to the bowl using the at least one securing groove 16. Specifically, the preferred groove 16 is part of a bayonet-type securing mechanism that is well know to those having skill in the art and requires twisting the lid 10 relative to the bowl. The shoulder 13 is preferred to provide a leverage point for a user to grasp and twist the lid 10 relative to the bowl for bayonet locking. The lid 10 is not limited to the inclusion of the shoulder 13 or to the specific shape and construction of the shoulder 13 described above.

Figure 3:
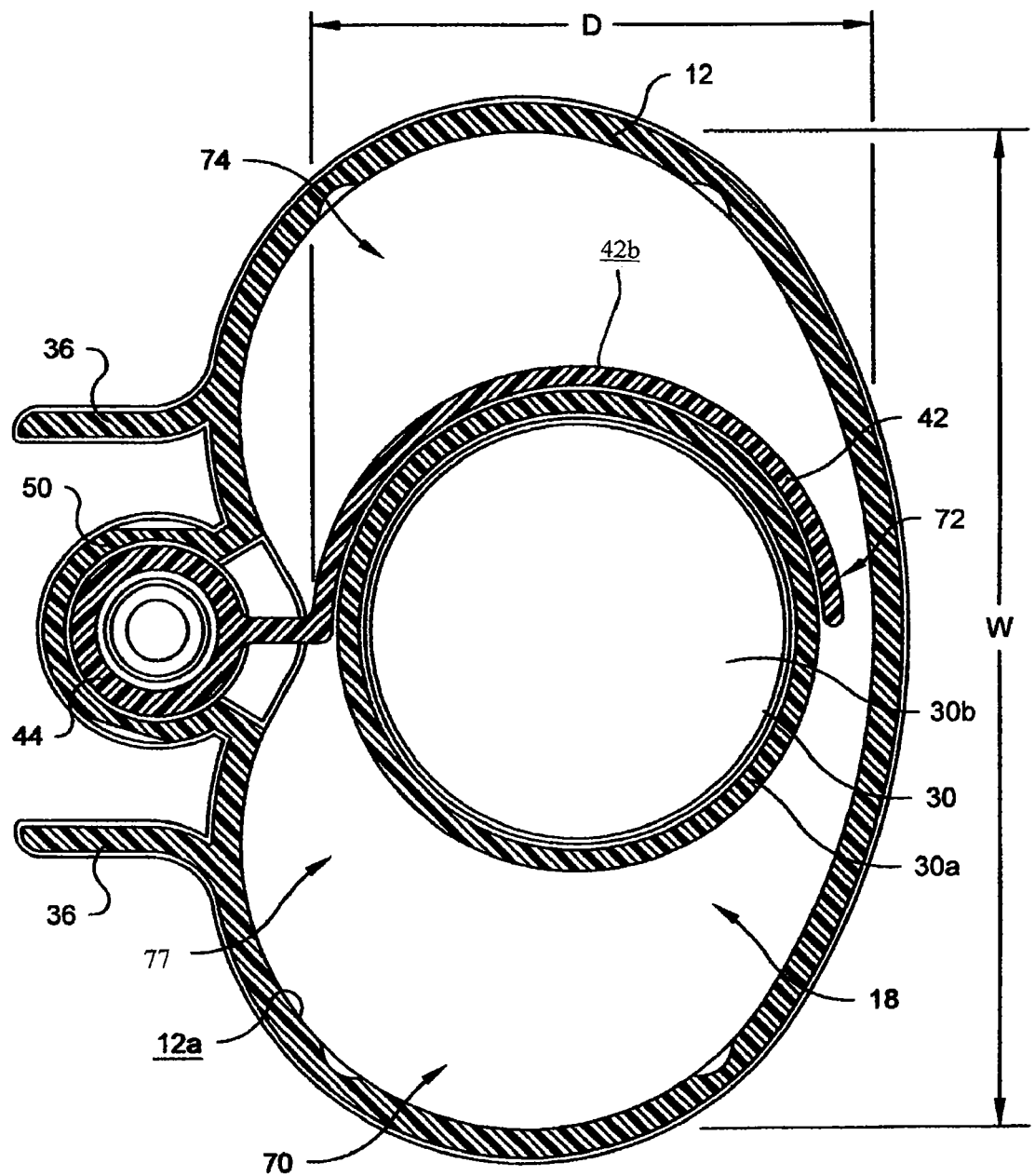
FIG. 3 is a cross-sectional view of a feed tube of the lid shown in FIG. 1, taken along line 3-3 of FIG. 2.
Figure 5:
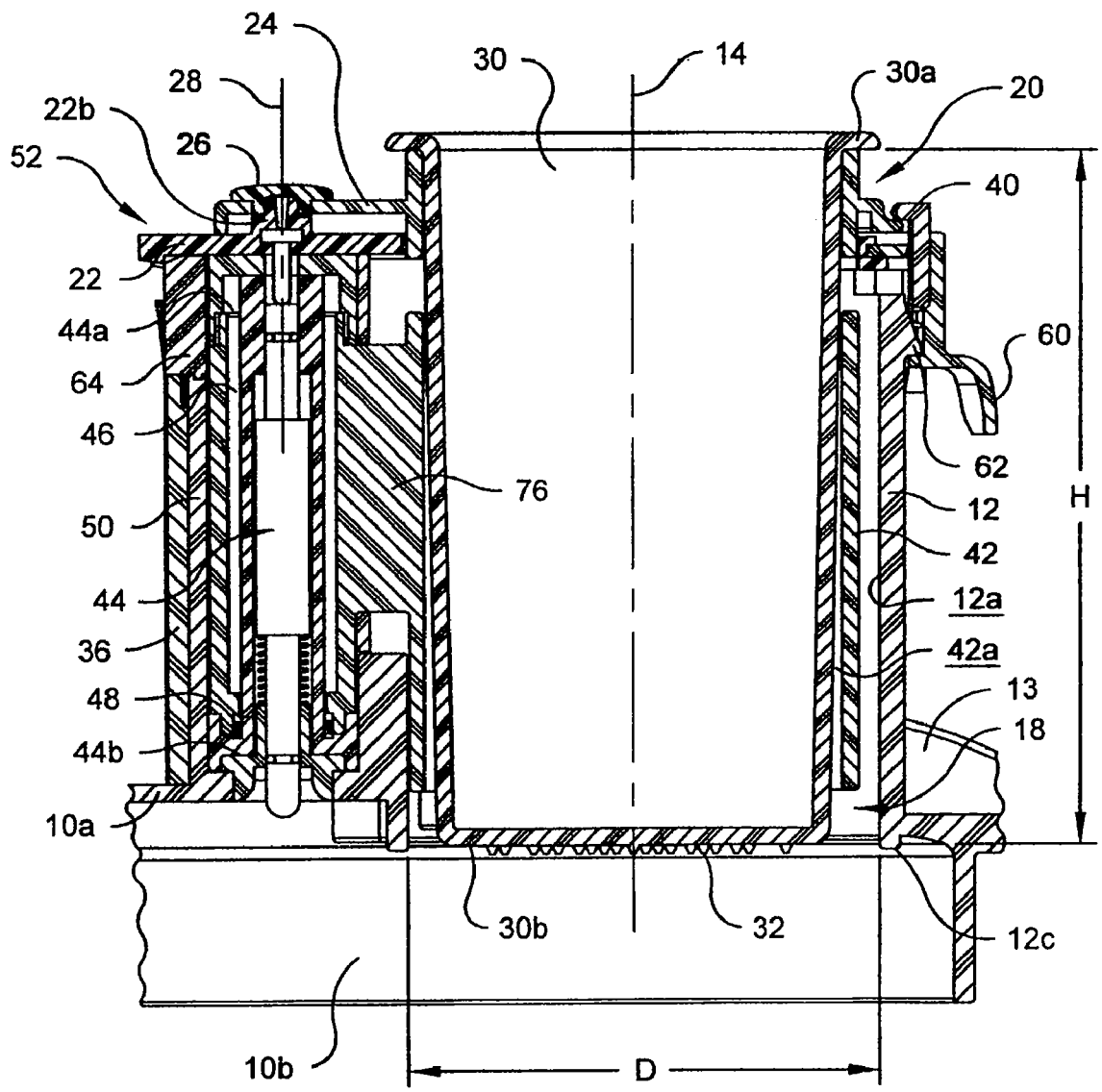
FIG. 5 is an enlarged cross-sectional view of a portion of the lid shown in FIG. 1, taken along line 5-5 of FIG. 4.
Figure 6:
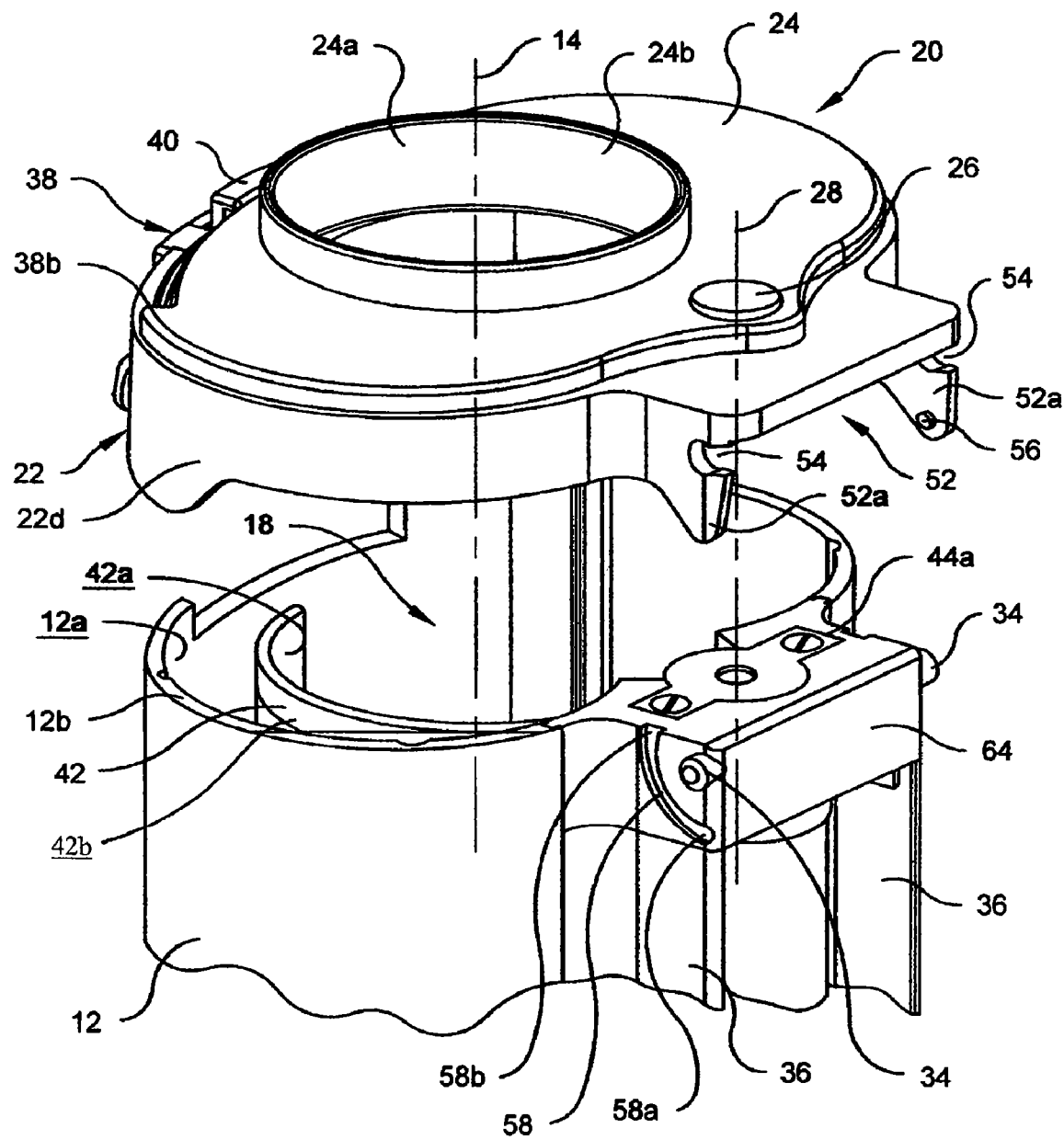
FIG. 6 is an enlarged, partially exploded perspective view of the feed tube and a feed tube lid of the lid shown in FIG. 1.

Referring to FIGS. 3, 5 and 6, the feed tube 12 includes an inner feed surface 12a defining a feed cavity 18 and a mouth 12b comprising a top open end for accessing the feed cavity 18. In the preferred embodiment, the feed tube 12 has a length that extends between the mouth 12b and an outlet feed end 12c comprising a bottom open end at a base of the feed tube 12, which provides access to the bowl in a working position. The inner feed surface 12a defines and bounds the feed cavity 18 that is located between the mouth 12b, outlet feed end 12c and inner feed surface 12a. Preferably, the feed tube 12 has a generally oval-shaped cross section taken along a horizontal plane that is caved-in to a point at one side and is hollow to accommodate the feed cavity 18. In operation, foodstuff is received in the feed cavity 18 for processing. In the preferred embodiment, the feed cavity 18 is comparatively larger than a feed cavity of a conventional food processor having the above-described safety dimensions. Specifically, the feed cavity 18 of the lid 10 is generally large enough to receive an average sized human hand therein or at least two potatoes. In the preferred embodiment, the feed cavity 18 has a height H of approximately three and one-half inches (3½"), a width W of approximately five inches (5"), and a depth D of approximately two and three-quarter inches (2¾"). The feed cavity 18 is not limited to the above-listed specific dimensions but is preferably larger that the feed cavity 18 of the above-described conventional food processor, it being understood that the feed cavity 18 could be larger or smaller and still function. The feed cavity 18 having the above-listed preferred dimensions is generally large enough to process two average sized potatoes at one time and a relatively large volume of foodstuff for grating, slicing, juicing and/or similar food processing operations.

Referring to FIGS. 1, 2 and 4-7, the lid 10 further includes a feed tube lid 20 that is moveably secured to the mouth 12b of the feed tube 12. In the preferred embodiment, the feed tube lid 20 is constructed of the transparent, molded SAN material and has a general peripheral shape of the mouth 12b of the feed tube 12. The feed tube lid 20 is not limited to the transparent, molded SAN material and may be constructed of nearly any rigid, structural material that is able to take on the general shape of the feed tube lid 20 and withstand the normal operating conditions of the feed tube lid 20. For example, the feed tube lid 20 may be constructed of any polymeric, metal, glass or related material that is able to take on the general shape of the feed tube lid 20 and withstand the normal operating conditions of the feed tube lid 20.

In the preferred embodiment, the feed tube lid 20 includes a collar 22 having an opening 22a and a moveable cover 24 disposed over the opening 22a. The cover 24 is pivotally mounted to the collar 22 and the collar 22 and cover 24 are in at least partial facing engagement. Preferably, the collar 22 and cover 24 are pivotally secured relative to each other by a feed tube lid pin 26. The feed tube lid pin 26 pivotally secures the cover 24 to the collar 22 such that the cover 24 is pivotable relative to the collar 22 about a feed tube lid axis or a swivel axis 28. The feed tube lid pin 26 is preferably constructed of the transparent, molded SAN material and has the general shape of a pin with a relatively large disk-shaped head and a shaft section. The feed tube lid pin 26 is not limited to constructions using the SAN material or the above-described shape and may be constructed of nearly any material and have nearly any shape that would be obvious to one having ordinary skill in the art to pivotally secure the cover 24 to the collar 22. For example, the feed tube lid pin 26 may be constructed of a stainless steel material and shaped in the form of a rivet that permits pivotal movement between the cover 24 and collar 22.

Referring to FIGS. 1, 2 and 6-8, in the preferred embodiment, the collar 22 has a generally planar upper surface 22c through which the opening 22a extends and a lip 22d that extends downwardly from the upper surface 22c at a periphery of the collar 22. The lip 22d extends below the mouth 12b and along a side of the feed tube 12 when the feed tube lid 20 is in the working position. The lip 22d preferably extends downwardly a greater distance from the upper surface 22c adjacent a front of the feed tube lid 20 than at sides of the feed tube lid 20. The lip 22d extends downwardly a greater distance at the front of the feed tube lid 20 such that a front of the mouth 12b is covered by the lip 22d before the feed tube lid 20 is in contact with the entire mouth 12b when pivoting the feed tube lid 20 into the working position. That is, when the feed tube lid 20 is pivoted from a loading position to the working position, as will be described in greater detail below, the extended front lip 22d blocks access to the feed cavity 18 before the upper surface 22c is fully engaged with the mouth 12b of the feed tube 12. The lip 22d and upper surface 22c are preferably constructed of the SAN material and are preferably integrally molded with each other but are not so limited.

Referring to FIGS. 1, 2 and 4-7, in the preferred embodiment, the feed tube pin 26 is ultrasonically welded to a stump 22b that extends from an upper surface of the collar 22. Ultrasonic welding of the stump 22b to the feed tube pin 26 fixes the feed tube pin 26 to the stump 22b. The feed tube pin 26 is not limited to being ultrasonically welded to the stump 22b and may be force-fit, adhesively bonded, screwed, integrally molded or otherwise mounted to the stump 22b in a manner that would be obvious to one having ordinary skill in the art. In addition, the feed tube pin 26 is not limited to being mounted to the stump 22b and may be mounted to the cover 24 and pivotable relative to the collar 22 or may take on nearly any other configuration that permits pivotal movement between the cover 24 and collar 22.

The collar 22 preferably has a top wall that at least partially covers the mouth 12b of the feed tube and a peripheral collar skirt that extends below the mouth 12b adjacent an outer surface of the feed tube 12 in a working position. The collar 22 preferably has this configuration to prevent foodstuff from escaping the feed cavity 18 and to locate the feed tube lid 20 over the mouth 12b of the feed tube 12 in a working position. The collar 22 also includes a generally rectangular projection extending from its rear that accommodates mounting of the collar 24 to the feed tube 12 and pivoting of the collar 24 relative to the feed tube 12, as will be described in greater detail below. The cover 24 has a generally kidney-shape in the preferred embodiment with a rounded projection at a rear side that accommodates the feed tube lid pin 26. Referring to FIG. 1, in a top view, the cover 24 has a periphery that is similar to approximately three fourths of the periphery of the collar 22. This configuration gives a clean appearance to the feed tube lid 20 which is comprised of the combination of the collar 22 and cover 24.

Figure 7:
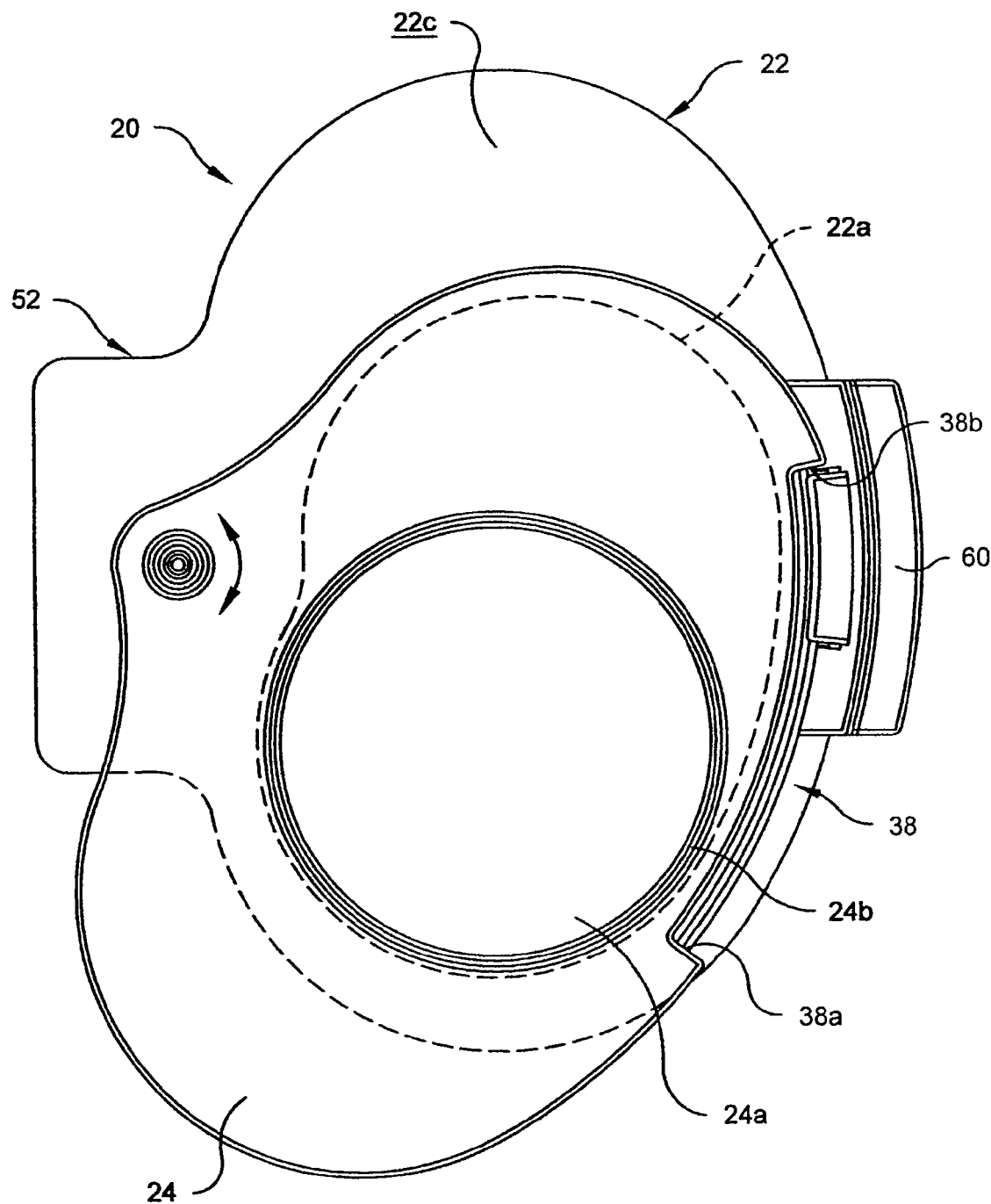
FIG. 7 is an enlarged top plan view of the feed tube lid shown in FIG. 6.
Figure 8:
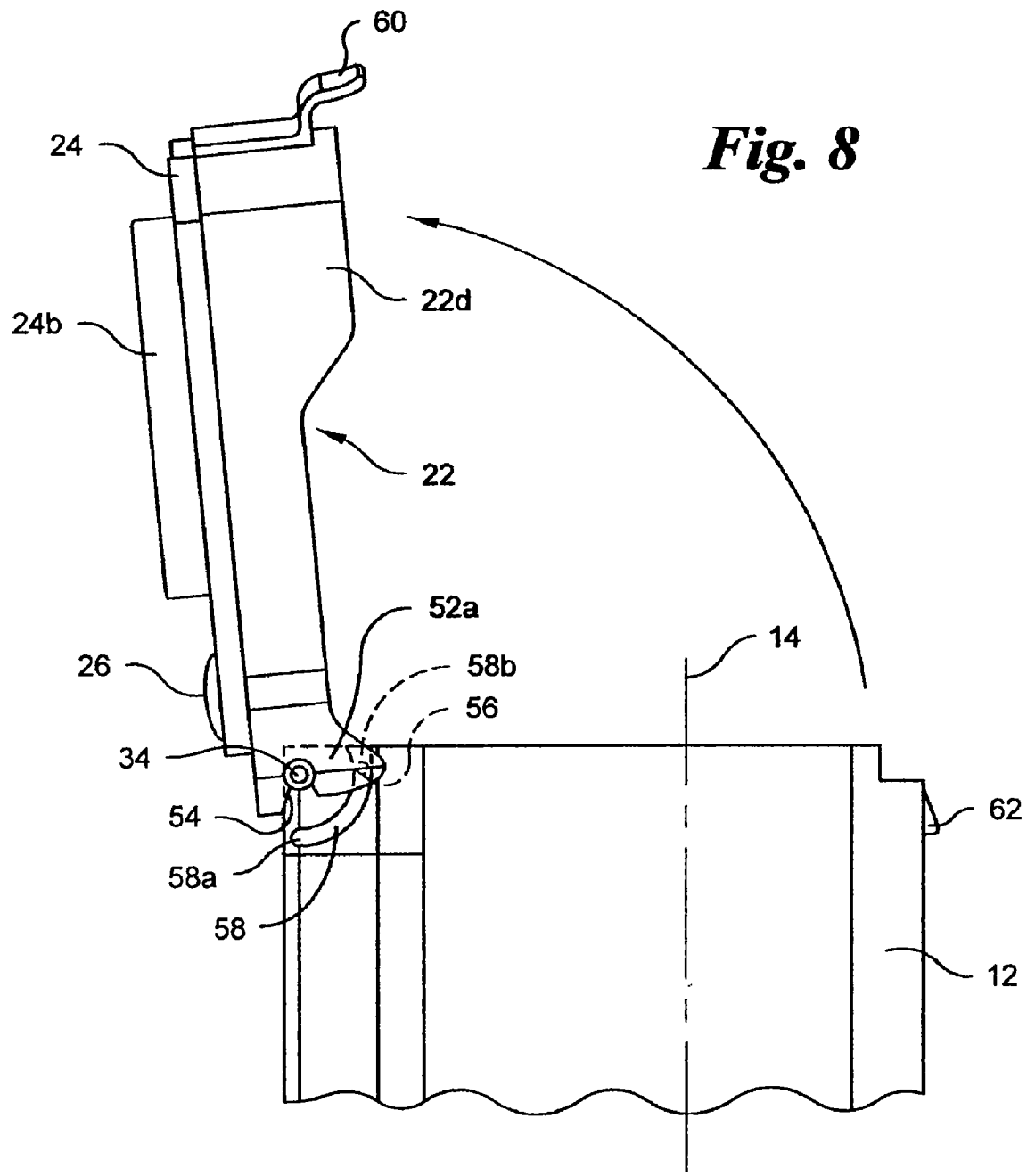
FIG. 8 is an enlarged, right-side elevational view of the feed tube lid and feed tube of the lid shown in FIG. 1 with the feed tube lid in a loading position.

Referring to FIG. 7, in the preferred embodiment, the opening 22a in the collar 22 is eccentrically located with respect to the feed tube axis 14 and has a generally arcing oblong-shape. The opening 22a is generally offset from the feed tube axis 14 to one side of the collar 22 as will be understood by one having ordinary skill in the art when the configuration and operation of the feed tube lid 20 is explained in further detail below. The opening 22a extends through the top wall of the cover 24 within the bounds of the skirt of the collar 22. The opening 22a is not limited to arcing oblong-shapes and may take on nearly any shape that falls within the bounds of the skirt of the collar 22 and permits normal operation of the feed tube lid 20 as will be described in greater detail below.

Referring to FIGS. 1, 5 and 7, in the preferred embodiment, the cover 24 is pivotable relative to the collar 22 between a first position (FIG. 1) and a second position (FIG. 7). The cover 24 includes a central hole 24a that is preferably positioned over the opening 22a of the collar 22 in the first and second positions and anywhere therebetween. The cover 24 also includes a neck 24b that defines the central hole 24a. In the first position, the cover 24 is preferably positioned within the periphery of the collar 22 when viewed from the top. In the second position, the cover 24 preferably extends at least partially beyond a periphery of the collar 22. The cover 24 is pivotable relative to the collar 22 to and between the first and second positions about the feed tube pin 26 and is at least partially guided in this pivotal movement by interaction between the neck 24b and the opening 22a. The central hole 24a of the cover 24 has a generally cylindrical shape in the preferred embodiment, which has a diameter of approximately two and one-half inches (2.5"), which is slightly smaller than the smallest width of the opening 22a in the collar 22. The cover 24 is preferably pivotable between the first and second positions where the central hole 24a is positioned over the opening 22a to provide at least partial access to a user through the central opening 24a into the feed cavity 18. Limited access to the feed cavity 18 through the central hole 24a permits loading of food into the feed cavity 18 while the feed tube lid 20 is in the working position without permitting a user's fingers to access the bowl or come into contact with a rotating tool (not shown).

Referring to FIGS. 1, 2, 4 and 5, a food pusher 30 is movably mounted on the feed tube lid 20. In the preferred embodiment, the food pusher 30 is constructed of the same SAN material as the feed tube 12 and feed tube lid 20 and has a generally hollow cylindrical shape with an upper pusher lip 30a and a lower pusher wall 30b. The food pusher 30 is not limited to constructions comprising the SAN material and may be constructed of nearly any rigid material that is able to take on the general shape of the pusher and perform the normal operating functions of the pusher, as is described in greater detail below. For example, the food pusher 30 may be constructed of any polymeric, metal, glass or related material, similar to the lid 10 and feed tube lid 20.

Preferably, the food pusher 30 is slideably disposed in the central hole 24a of the cover 24 during operation and is guided in its movement by the neck 24b. The outside diameter of the body of the food pusher 30 is preferably at least slightly smaller than the central hole 24a such that the food pusher 30 is slideable into and out of the central hole 24a. However, the pusher lip 30a has an outside diameter that is larger than the central hole 24a such that the food pusher 30 does not slide completely through the central hole 24a and slides only to a point where the lip 30a engages the neck 24b the cover 24 (FIG. 5). In the working position, the food pusher 30 extends through the central hole 24a in the cover 24 and the opening 22a in the collar 22 to preferably, completely cover the mouth 12b of the feed tube 12. The feed tube lid 20 and food pusher 30 cover the mouth 12b of the feed tube 12 such that a user is unable to access the feed cavity 18 and rotating tool when the feed tube lid 20 and pusher 30 are in the working position.

As will be obvious to one having ordinary skill in the art, the food pusher 30 is slideable through the central hole 24a to urge foodstuff toward the outlet feed end 12c of the feed tube 12 and, therefore, has a height of approximately three and one-half inches (3.5") in the preferred embodiment. The food pusher 30 is not limited to having this preferred height and may have a smaller or larger height that accommodates the manipulation of food within the feed cavity 18. The food pusher 30 preferably does not have a height that is large enough to extend out of the feed cavity 18 such that the food pusher 30 is engageable by the tool during processing when the pusher lip 30a engages the neck 24b of the cover 24.

In the preferred embodiment, the food pusher 30 includes a plurality of food spikes 32 on its pusher wall 30b that extend outwardly from the pusher wall 30b. The food spikes 32 preferably have pointed ends and are used to engage and grip foodstuff within the feed cavity 18 such that the foodstuff is at least partially grasped by the food spikes 32. The food pusher 30 is not limited to the inclusion of food spikes 32 or the described cylindrical shape. The food pusher 30 may be constructed of nearly any shape that permits slideable movement relative to the feed tube lid 20 for manipulating foodstuff within the feed cavity 18 and preferably pushing foodstuff toward the outlet feed end 12c. For example, the food pusher 30 may have a generally square shape and the central hole 24a and neck 24b may have a generally square shape to accommodate the slideable movement of the food pusher 30 therein.

Preferably, the food pusher 30, cover 24 and collar 22 completely cover the mouth 12b of the feed tube 12 when the feed tube lid 20 and food pusher 30 are in the working position. Covering the mouth 12b not only blocks access to the feed cavity 18 and bowl during operation but blocks foodstuff that may splatter out of the bowl and into the feed cavity 18 from escaping from the feed cavity 18.

Referring to FIGS. 1, 2, 5, 6 and 8, in the preferred embodiment, the feed tube lid 20 is pivotally mounted to the feed tube 12. The feed tube lid 20 is preferably pivotable between the working position (FIG. 1) at least partially covering the mouth 12b of the feed tube 12 and a loading position (FIG. 8) where the mouth 12b is exposed. In the working position, the feed tube lid 20 is pivoted such that the collar 22 is in partial facing engagement with the mouth 12b of the feed tube 12. In the loading position, the feed tube lid 20 is pivoted such that the collar 22 is out of engagement with the mouth 12b of the feed tube 12. In the working position, the feed cavity 18 is covered such that a user may not gain access to the feed cavity 18, other than through the central hole 24a. However, in the loading position, the feed cavity 18 is exposed such that a large sized foodstuff or a relatively large volume of foodstuff may be loaded into the feed cavity 18 through the mouth 12b.

The feed tube lid 20 is preferably pivotable about at least one pivot pin 34 disposed on the feed tube 12. In the preferred embodiment, the at least one pivot pin 34 is comprised of a pair of pivot pins 34 that are located on either side of a pair of feed tube walls 36 that extend upwardly from the top lid wall 10a to a rear of the mouth 12b of the feed tube 14. The pivot pins 34 preferably have a generally cylindrically shape and extend from opposite sides of the feed tube walls 36. The feed tube walls 36 and pivot pins 34 are preferably constructed of the same SAN material as the feed tube 12, as was described above and are preferably integrally molded with the feed tube 12. However, the pivot pins 34 and feed tube walls 36 are not limited such constructions and may be constructed of nearly any material and have nearly any shape that is able to take on the general shape of the pivot pins 34 and feed tube walls 26 and withstand the normal operating conditions of the pivot pins 34 and feed tube walls 36, as is described in greater detail below.

Referring to FIGS. 3 and 5-7, in the preferred embodiment, the cover 24 is pivotable between the first position where the food pusher 30 is located adjacent a center 72 of the feed cavity 18 and a second position, where the food pusher 30 is located adjacent a compacting side 70 of the feed cavity 18, when the food pusher 30 is in its working position. The pivotable movement of the cover 24 relative to the collar 22 permits the food pusher 30 to manipulate foodstuff in different areas of the feed cavity 18. For example, in the first position, the food pusher 30 is able to manipulate and preferably push foodstuff that is located adjacent a center 70 of the feed cavity 18 toward the outlet feed end 12c of the feed tube 14. In the second position of the cover 24, the food pusher 30 is able to manipulate the foodstuff that is located adjacent the compacting side 70 of the feed cavity 18. Therefore, the food pusher 30 is able to engage and manipulate foodstuff within various parts of the relatively large feed cavity 18. If the cover 24 were not pivotable to allow coverage for the food pusher 30 in different areas of the feed cavity 18, foodstuff that is positioned in various portions of the feed cavity 18 would not be engageable by the food pusher 30 and may be difficult to manipulate in the enlarged feed cavity 18. The cover 24 is not limited to pivotal movement between the described first and second positions and may move in nearly any direction relative to the collar 22 to position the food pusher 30 in nearly any area of the feed cavity 18. For example, the cover 24 may be modified to pivot beyond the first position such that the food pusher 30 is located adjacent a loading side 74 of the feed cavity 18 to manipulate foodstuff that is located adjacent the loading side 74 of the feed cavity 18.

Figure 4:
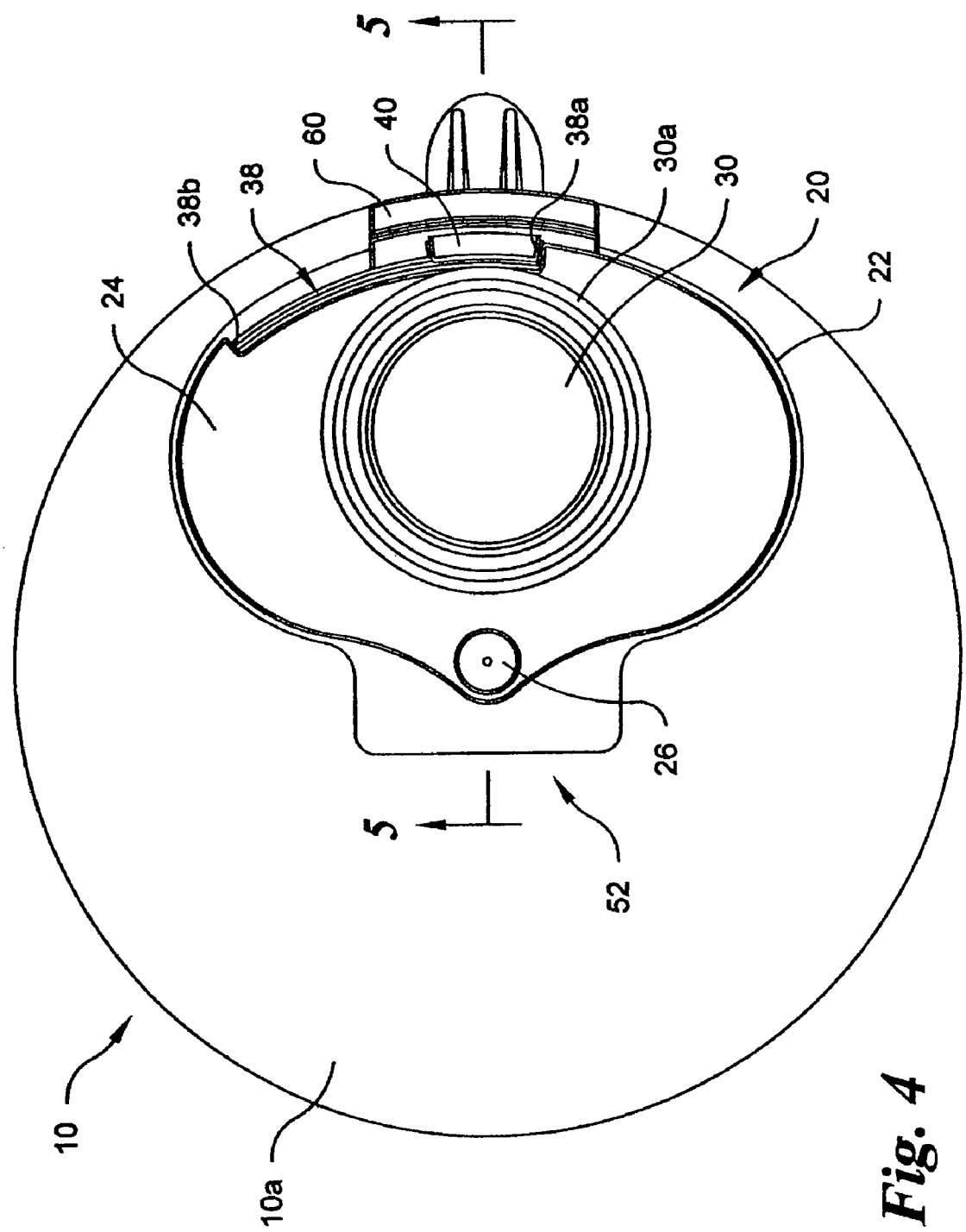
FIG. 4 is a top plan view of the lid shown in FIG. 1.

Referring to FIGS. 1, 4 and 7, in the preferred embodiment, the cover 24 includes a peripheral groove 38 with a first groove end 38a and a second groove end 38b. In addition, the collar 22 includes a stop 40 that is at least partially positioned within the peripheral groove 38. In the preferred embodiment, the peripheral groove 38 is constructed of a constant cross-sectional groove in a portion of the periphery of the cover 24 between the first and second groove ends 38a, 38b. The stop 40 preferably has a generally L-shaped cross-section with a leg that extends into the peripheral groove 38 to both secure the cover 24 to the collar 22 and limit the pivotable movement of the cover 24 relative to the collar 22 between the first and second positions. The stop 40 in cooperation with the feed tube lid pin 26 pivotally mounts the cover 24 to the collar 22. The stop 40 is preferably constructed of the same SAN material as the feed tube lid 20 and is a separate component that is fixed to the collar 22. The stop 40 is not limited to constructions having the same material as the feed tube lid 20 and being a separate component with respect to the collar 22. For example, the stop 40 may be constructed of a different material than the collar 22 that is integrally formed with the collar 22 as long as the stop 40 is able to take on the general shape of the stop 40 and withstand the normal operation of the lid 10.

The stop 40 is preferably in contact with the first groove end 38a when the cover 24 is in the first position and is in contact with the second groove end 38b when the cover 24 is in the second position. Accordingly, when the stop 40 is in contact with the first groove end 38a the central hole 24a is positioned generally over the center 72 of the feed cavity 18 and when the stop 40 is in contact with the second groove end 38b, the central hole 24a is positioned generally over the compacting side 70 of the feed cavity 18. The grove 38 and stop 40 preferably limit the movement of the cover 24 relative to the collar 22 between the first and second positions such that the central hole 24 is positionable over the center 72 and compacting side 70 of the feed cavity 18, respectively.

Figure 2:
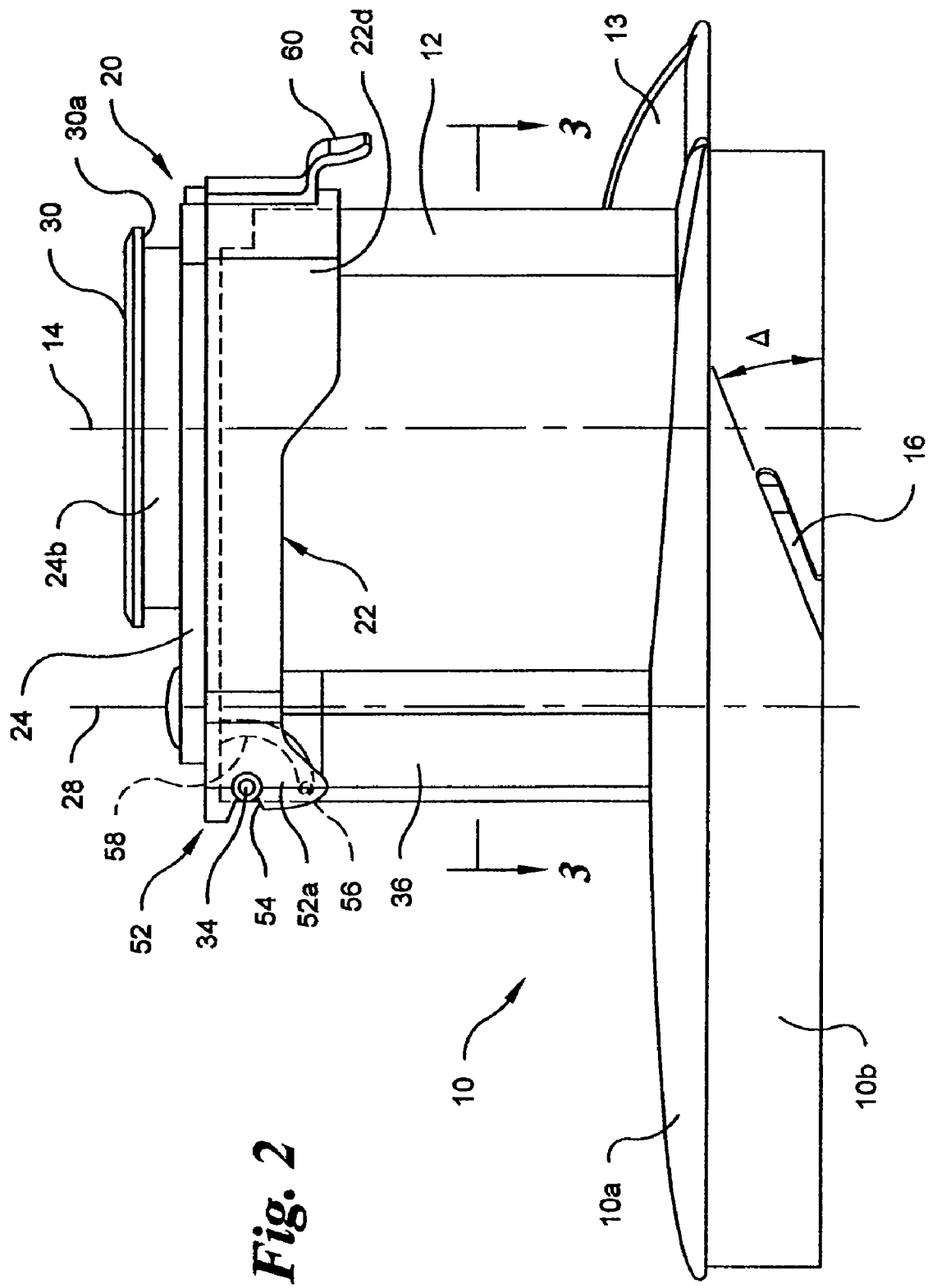
FIG. 2 is a right-side elevational view of the lid shown in FIG. 1.

Referring to FIGS. 1, 2 and 5, the food pusher 30 is moveable relative to the feed tube 12 in first and second directions in the working position. Specifically, the movement of the food pusher 30 in the first direction is generally parallel to the feed tube axis 14 and the movement of the food pusher 30 in the second direction is generally perpendicular to the feed tube axis 14. The preferred food pusher 30 is slideable within the central hole 24a, guided by the neck 24b, to urge foodstuff within the feed cavity 18 toward the outlet feed end 12c or out of the central hole 24a, each in the first direction. In addition, in the preferred embodiment, the food pusher 30 is pivotable along with the neck 24b while positioned within the central hole 24a along an arc between the first and second positions of the cover 24. This second direction is generally perpendicular to the first direction. That is, the food pusher 30 may be moved vertically in the neck 24b and along the described arc to different positions within the feed cavity 18 while the lid 20 and food pusher 30 are in the working position covering the mouth 12b. Movement of the food pusher 30 to the various positions in the feed cavity 18 allows nearly complete coverage for the food pusher 30 within the feed cavity 18 to manipulate foodstuff therein. The food pusher 30 is not limited in this arcing movement of the cover 24 relative to the collar 22 when moving in the second direction.

In the preferred embodiment, the central neck 24b guides movement of the food pusher 30 in the first direction. Preferably, the outside surface of the cylindrical food pusher 30 is slideable in the generally cylindrical central hole 24a of the neck 24b. However, as was described above, the food pusher 30 is not limited to cylindrical configurations and the central hole 24a is also not so limited. The food pusher 30, neck 24b and central hole 24a may take on nearly any shape that permits movement of the food pusher 30 in the first direction relative to the feed tube lid 20.

In the preferred embodiment, the feed tube lid 20 is removable from the mouth 12b of the feed tube 12. The feed tube lid 20 may be pivotable relative to the mouth 12b between the working and loading positions such that the feed tube lid 20 is removable from the feed tube 12 from the loading position. However, the feed tube lid 20 is not limited to such configurations and may, for example, be snap-fit to the feed tube mouth 12b such that the feed tube lid 20 is removed from the mouth 12b by releasing the snap-fit to alternatively cover or expose the mouth 12b.

Referring to FIGS. 3, 5 and 6, the feed tube 12 includes a continuous inner surface 12a that defines the enlarged feed cavity 18. In the preferred embodiment, the feed tube walls 36 that support the pivot pins 34 are positioned outside the feed cavity 18 and a moveable gate 42 is positioned entirely within the enlarged feed cavity 18. The moveable gate 42 is moveable within the feed cavity 18 between an open position and a compacting position. The gate 42 is preferably pivotable within the feed cavity 18 about the swivel axis 28. The moveable gate 42 includes a compacting surface 42a that is used to urge foodstuff toward the compacting side 70 of the feed cavity 18.

In the preferred embodiment, the movable gate 42 is constructed of the same SAN material as was described above for the feed tube 12 and food pusher 30 and has a generally half-cylindrical shape. The moveable gate 42 is not limited to the SAN material and may be constructed of nearly any material that is able to take on the general shape moveable gate 42 and perform the normal operating functions of the moveable gate 42. The compacting side 42a of the gate 42 is preferably facing the food pusher 30 when the food pusher 30 is positioned within the feed cavity 18 and a convex side 42b of the gate 42 is preferably facing away from the food pusher 30 when the food pusher 30 is in the feed cavity 18. The gate 42 is not limited to half-cylindrically-shapes and may have nearly any shape that permits movement of the movable gate 42 within the feed cavity 18.

Referring to FIGS. 3, 5 and 6, in the preferred embodiment, the feed tube 12 includes a feed tube slot 44 having an open first end 44a adjacent the mouth 12b of the feed tube 12 and a closed second end 44b adjacent the outlet feed end 12c of the feed tube 12. In the preferred embodiment, the slot 44 is defined by a feed tube pillar 50 that extends between the feed tube walls 36 and forms a portion of the feed tube 12. The slot 44 is preferably at least partially exposed to the feed cavity 18 between the first and second ends 44a, 44b. The feed tube slot 44 is comprised of a generally cylindrical tube-shaped void in the feed tube 12 formed between the feed tube walls 36. When the feed tube lid 20 is in the working position, the feed tube slot 44 is completely covered by a projection 52 of the feed tube lid 20.

In the preferred embodiment, a hub 46 is removably positionable within the slot 44 and is secured to the moveable gate 42. The hub 46 preferably has a half-cylindrical shape and is secured to the moveable gate 42 along an edge of the gate 42 that is positioned adjacent the feed tube slot 44 by a bar 76. In the preferred embodiment, the hub 46 is integrally formed with the moveable gate 42 and bar 76 and each is constructed of the same SAN material as the lid 10. The hub 46 and bar 76 is not limited to the SAN material and may be constructed of nearly any material that can be formed into the general shape of the hub 46 and bar 76 and withstand the normal operating conditions of the hub 46 and bar 76. In the preferred embodiment, the hub 46 is slideable into the slot 44 such that a lower end of the hub 46 contacts the second closed end 44*b* of the slot 44 and an upper end of the hub 46 is positioned below the open first end 44*a*. The hub 46 preferably slideably fits within the slot 44 and is pivotable therein to secure the hub 46 therein and to pivotally mount and locate the moveable gate 42 within the feed cavity 18.

The hub 46 and attached moveable gate 42 of the preferred embodiment are biased toward the compacting position by a torsion spring 48 adjacent the closed second end 44*b* of the feed tube slot 40. The torsion spring 48 is preferably secured at one end to the moveable gate 42 or, specifically to the hub 46 and at the second end to the feed tube 12 or, specifically to the slot 44. The torsion spring 48 is constructed of a material and has spring properties that would be obvious to one having ordinary skill in the art taking into consideration the operation of the movable gate 42. The gate 42 is not limited to being biased toward the compacting position by the torsion spring 48. However, the torsion spring 48 is preferred such that the gate 42 is constantly urged to pivot toward the compacting side 70 such that foodstuff within the feed cavity 18 is urged by the compacting side 42*a* of the gate 42 toward the compacting side 70 of the feed cavity 18. The torsion spring 48 biases the gate 42 toward the compacting side 70 of the feed cavity 18 so that foodstuff is consolidated therein. Therefore, the food pusher 30 is able to contact and urge the foodstuff toward the outlet feed end 12*c* as the gate 42 urges the foodstuff toward the compacting side 70 of the feed cavity 18.

Referring to FIG. 3, in the preferred embodiment, a sub-feed cavity 77 is defined by the compacting side 42*a* of the gate 42 and at least a portion of the inner surface 12*a* of the feed tube 12. It is preferred that the sub-feed cavity 77 is formed by the gate 42 and a portion of the inner surface 12*a* of the feed tube 12 adjacent the compacting side 70 of the feed cavity 18 for consolidation of the processing foodstuff therein. When the foodstuff is consolidated within the sub-feed cavity 77, the food pusher 30 may be positioned over the sub-feed cavity 77 to urge the compacted foodstuff toward the outlet feed end 12*c* of the feed tube 12.

Referring to FIGS. 3, 5 and 7, in the preferred embodiment, the food pusher 30 substantially fills the sub-feed cavity 77 when the moveable gate 42 is in the compacting position and the pusher lip 30*a* is engaged with the neck 24*b* of the cover 24. The food pusher 30 is not limited to a size that substantially fills the sub-feed cavity 77 when the moveable gate 42 is in the compacting position and the pusher lip 30*b* is engaged with the neck 24*b*. For example, the food pusher 30 may be smaller than the sub-feed cavity 77 and still function to urge foodstuff toward the outlet feed end 12*c*. In addition, the food pusher 30 may have various shapes and sizes that do not substantially fill the sub-feed cavity 77 in the compacting and storage positions, respectively.

Referring to FIGS. 1, 2 and 6, the collar 22 of the feed tube 12 includes the hinge projection 52 extending from its periphery adjacent the feed tube lid pin 26. The hinge projection 52 includes a generally planar top surface and a pair of hinge legs 52*a* that extend downwardly from the top surface. The hinge legs 52*a* accommodate a pair or U-shaped channels 54 that are complementary to the pivot pins 34 extending from the feed tube walls 36. The feed tube lid 20 is removably mounted to the feed tube 12 through releasable engagement between the channels 54 and pivot pins 34. The feed tube lid 20 is pivotable relative to the feed tube 12 about the channels 54 by inserting each of the pivot pins 34 into an open end of the channels 54 until each of the pivot pins 34 rests in a closed end of the channel 54. The feed tube lid 20 is not limited to releasable, pivotable engagement with the feed tube 12 and may be snap-fit, bolted, fixed to or integrally molded with the feed tube 12. However, it is preferred that the feed tube lid 20 be pivotable relative to the feed tube 12 such that the mouth 12*b* can be alternatively exposed or closed during operation of the lid 10.

In the preferred embodiment, the channels 54 and pivot pins 34 are integrally constructed with the hinge projection 52 and feed tube walls 36, respectively. The channels 54 and pivot pins 34 are not limited to integral constructions with these components and may be flip-flopped such that the pivot pins 34 are associated with the collar 22 and the channels 54 are associated with the feed tube walls 36. In addition, the feed tube lid 10 is not limited to being pivotable relative to the feed tube 12 through the use of the channels 54 and pivot pins 34. For example, the feed tube lid 20 may be pivotable relative to the feed tube 12 using a butterfly hinge or nearly any type of hinge that permits pivotable movement of the feed tube lid 20 relative to the feed tube 12 and would be obvious to one having ordinary skill in the art.

In the preferred embodiment, the hinge legs 52*a* further include a pair of guide pins 56 that extend therefrom toward the feed tube walls 36 and the feed tube walls 36 include arc-shaped grooves 58 facing outwardly therefrom. The guide pins 56 guide the pivotal movement of the feed tube lid 20 between the working and a loading position. Specifically, when the feed tube lid 20 is mounted to the feed tube 12, the guide pins 56 are slideably positioned within the arc-shaped grooves 58. When the pivot pins 34 are engaged with the channels 54 and the guide pins 56 are engaged with the arc-shaped grooves 58, the feed tube lid 20 is removable from the feed tube 12 only from the loading position. That is, when the channels 54, pivot pins 34, guide pins 56 and arc-shaped grooves 58 mount the collar 22 to the feed tube 12, the feed tube lid 20 is not releaseable from the feed tube 12 in any position other than the loading position or in a position relatively close to the loading position. It will be understood by one having ordinary skill in the art that this pivotable engagement of the feed tube lid 20 to the feed tube 12 is not limiting, as was described above, but is preferred so that the feed tube lid 20 is only removable from the feed tube 12 from the loading position to secure the feed tube lid 20 to the feed tube 12 in the working position and any position between the working and loading positions.

Referring to FIGS. 1-3 and 5-8, in operation, the lid 10 is generally stored in its working position as is shown in FIG. 1. The lid 10 is positioned on the bowl of the food processor by engaging the securing groove 16 with a complementary groove or pin on the bowl. The feed tube lid 20 is released from engagement with the feed tube 12 by pulling on a lid release tab 60 that releases from a hook edge 62 of the feed tube 12. Upon release of the lid release tab 60, the feed tube lid 20 is pivoted from its working position (FIG. 1) to its loading position (FIG. 8) where the top wall of the hinge projection 52 engages a spacer 64 between the feed tube walls 36. In the loading position, the pivot pins 34 are engaged with a closed end of the channel 54 and the guide pins 56 are positioned at a second end 58*b* of the arc-shaped groove 58. From the loading position, the guide pins 56 are disengaged from the arc-shaped grooves 58, the pivot pins 34 are disengaged from the channel 54 through the open end of the channel 54 and the feed tube lid 20 is removed from the feed tube 12. Removal of the feed tube lid 20 from the feed tube 12 simplifies cleaning of the feed tube lid 20 and insertion of foodstuff into the open feed tube mouth 12b.

In the preferred embodiment, the lid release tab 60 is pivotally mounted to the feed tube lid 20 and releasably secures the feed tube lid 20 in the working position by releasably engaging the feed tube 12. The lid release tab 60 is preferably constructed of an injection molded acrylonitrile butadiene styrene (ABS) material and is hingedly mounted to the collar 22. The lid release tab 60 is not limited to being constructed of ABS material or to being hingedly mounted to the collar 22. The lid release tab 60 may be constructed of nearly any generally rigid material that can take on the generally shape of the lid release tab 60 and withstand the normal operating conditions of the lid release tab 60. In addition, the lid release tab 60 may be mounted to any portion of or in any manner to the feed tube 20, as long as the lid release tab 60 is able to releasably secure the feed tube lid 20 to the feed tube 12 in the working position. For example, the lid release tab 60 may be integrally molded with the feed tube 12 and pivotally mounted to the feed tube 12 by a living hinge (not shown) to releasably secure the feed tube lid 20 in the working position.

When the feed tube lid 20 is in the loading position or removed from the feed tube 12, the gate 42 is urged against the bias of the torsion spring 48 toward the loading side 74 of the feed cavity 18. Foodstuff of any size, in the preferred embodiment oversized foodstuff or a large of volume of foodstuff (not shown), is placed into the feed cavity 18 on the compacting side 42a of the gate 42. The gate 42 is held against the bias of the torsion spring 48 until the entire foodstuff, for example, two potatoes, is loaded into the feed cavity 18. The gate 42 is released to apply a pressure on a side of the foodstuff such that the compacting side 42a urges the foodstuff toward the compacting side 70 of the feed cavity 18. The feed tube lid 20 is mounted to the feed tube 12 and is pivoted from its loading position to its working position where the lid release tab 60 engages the hook edge 62 of the feed tube 12. The food pusher 30 is inserted into the central hole 24a of the cover 24 until the food spikes 32 engage the foodstuff within the feed cavity 18.

The food processor is powered and a processing tool (not shown) begins to process the foodstuff. The food pusher 30 urges the foodstuff toward the tool such that a bottom of the foodstuff is processed by the tool. The food pusher 30 may be used to manipulate foodstuff in various parts of the feed cavity 18 by moving the cover 24 relative to the collar 22. Specifically, referring to FIG. 7, the food pusher 30 generally pushes foodstuff that is positioned near the center 72 of the feed cavity 18 when the cover 24 is in the first position. Alternatively, the food pusher 30 pushes foodstuff that is adjacent the compacting side 70 of the feed cavity 18 when the cover 24 is in the second position. When the food pusher 30 has urged all of the foodstuff in the compacting side 70 of the feed cavity 18 toward the processing tool and out of the feed cavity 18, the food pusher 30 is moved upwardly in the first direction out of the feed cavity 18 and the gate 42 urges the remaining foodstuff within the feed cavity 18 toward the compacting side 70. In the preferred embodiment, the gate 42 only pivots to a position where the food pusher 30 may be urged parallel to the feed axis 14 into the feed cavity 18 through the central hole 24a when the cover 24 is in the second position. Accordingly, the preferred gate 42 does not pivot to a position where it blocks movement of the food pusher 30 in the first direction into the compacting side 70 of the feed cavity 18.

When all of the foodstuff within the feed cavity 18 and sub-feed cavity 77 have been processed, the food pusher 30 is removed from the central hole 24a and power is cut to the food processor. The lid release tab 60 is pulled, thereby releasing the hook edge 62 and permitting the feed tube lid 20 to pivot toward the loading position. The pivoting of the feed tube lid 20 is guided by the engagement of the channels 54 with the pivot pins 34 and the movement of the guide pins 56 within the arc-shaped grooves 58. When the guide pins 56 reach the second end 58b, the feed tube lid 20 is in the loading position and may be removed from the feed tube 12 by moving the feed tube lid 20 upwardly and away from the pivot pins 34 such the pivot pins 34 are released from the open end of the channel 54. The gate 42 is grasped and pulled upwardly such that the bar 76 and hub 46 are released from feed tube pillar 50 through its open upper end. The remaining components of the lid 10 are then released from the food processor bowl and all of the components may be cleaned. Alternatively, the lid 10 can be immediately released from the bowl so that a user can gain immediate access to the processed foodstuff for use.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A lid for a bowl of a food processor for processing a relatively large size or a large volume of foodstuff comprising:
a top lid wall;
a feed tube extending from the top lid wall along a feed axis, the feed tube including a continuous inner feed surface defining a feed cavity;
a moveable gate positioned entirely within the feed cavity, the moveable gate being pivotable about a hub on a swivel axis, the movable gate pivotable within the feed cavity between an open position and a compacting position, the swivel axis being generally parallel to the feed axis.

2. The lid of claim 1 further comprising:
a feed tube lid movably secured to the feed tube.

3. The lid of claim 1 wherein the feed tube lid includes a collar having an opening and a moveable cover disposed over the opening.

4. The lid of claim 1 wherein the hub is positioned within a portion of the feed tube.

5. A lid for a bowl of a food processor for processing a relatively large size or a large volume of foodstuff comprising:
a top lid wall;
a feed tube extending from the top lid wall along a feed axis, the feed tube including a continuous inner feed surface that defines a feed cavity;
a food pusher being movable generally parallel to the feed axis within the feed tube; and
a moveable gate positioned within the feed cavity, the moveable gate being pivotable about a hub on a swivel axis, the movable gate pivotable within the feed cavity between an open position and a compacting position, the swivel axis being generally parallel to the feed axis,
wherein the entire movable gate is positioned entirely within the feed cavity.

6. The lid of claim 5 further wherein the feed tube includes a feed tube slot and the hub is removably positionable within the slot.

* * * * *